(12) United States Patent
Hoshiba et al.

(10) Patent No.: US 9,385,358 B2
(45) Date of Patent: Jul. 5, 2016

(54) SEPARATOR FOR RECHARGEABLE LITHIUM BATTERY, AND RECHARGEABLE LITHIUM BATTERY INCLUDING THE SAME

(71) Applicants: Samsung SDI Co., Ltd., Yongin-si, Gyeonggi-do (KR); Teijin Limited, Osaka-shi, Osaka (JP)

(72) Inventors: Koji Hoshiba, Yokohama (JP); Satoshi Nishikawa, Tokyo (JP)

(73) Assignee: Samsung SDI Co., Ltd., Yongin-si (KR)

( * ) Notice: Subject to any disclaimer, the term of this patent is extended or adjusted under 35 U.S.C. 154(b) by 337 days.

(21) Appl. No.: 13/951,407

(22) Filed: Jul. 25, 2013

(65) Prior Publication Data
US 2014/0030578 A1  Jan. 30, 2014

(30) Foreign Application Priority Data

Jul. 25, 2012  (JP) .................................. 2012-164505
Jun. 25, 2013  (KR) ........................ 10-2013-0073190

(51) Int. Cl.
| | |
|---|---|
| *H01M 2/16* | (2006.01) |
| *H01M 2/18* | (2006.01) |
| *B32B 27/20* | (2006.01) |
| *B32B 5/02* | (2006.01) |
| *B32B 9/00* | (2006.01) |
| *B32B 9/04* | (2006.01) |
| *B32B 15/08* | (2006.01) |

(Continued)

(52) U.S. Cl.
CPC ............. *H01M 2/1653* (2013.01); *B32B 5/022* (2013.01); *B32B 9/007* (2013.01); *B32B 9/045* (2013.01); *B32B 15/08* (2013.01); *B32B 27/08* (2013.01); *B32B 27/12* (2013.01); *B32B 27/20* (2013.01); *B32B 27/281* (2013.01); *B32B 27/32* (2013.01); *H01M 2/168* (2013.01); *H01M 2/1686* (2013.01); *B32B 2255/10* (2013.01); *B32B 2262/062* (2013.01); *B32B 2264/025* (2013.01); *B32B 2264/0235* (2013.01); *B32B 2307/202* (2013.01); *B32B 2307/546* (2013.01); *B32B 2457/00* (2013.01); *B32B 2457/12* (2013.01); *H01M 10/052* (2013.01)

(58) Field of Classification Search
None
See application file for complete search history.

(56) References Cited

U.S. PATENT DOCUMENTS 5,964,903 A * 10/1999 Gao et al. .................... 29/623.1
6,632,561 B1  10/2003 Bauer et al.
(Continued)

FOREIGN PATENT DOCUMENTS

| JP | 10-110052 A | 4/1998 |
|---|---|---|
| JP | 10-189054 A | 7/1998 |

(Continued)

OTHER PUBLICATIONS

Machine English Translation of JP-10-223195 A, 8 pages.
(Continued)

*Primary Examiner* — Patrick Ryan
*Assistant Examiner* — Jose Colucci Rios
(74) *Attorney, Agent, or Firm* — Lewis Roca Rothgerber Christie LLP (57) ABSTRACT

Disclosed are a separator for a rechargeable lithium battery including a porous substrate and an adherence porous layer on at least one side of the porous substrate, and including a first fluorovinylidene-hexafluoropropylene copolymer, a second fluorovinylidene-hexafluoropropylene copolymer, and filler particles, and a rechargeable lithium battery including the same.

17 Claims, 3 Drawing Sheets

(51) Int. Cl.
*B32B 27/08* (2006.01)
*B32B 27/12* (2006.01)
*B32B 27/28* (2006.01)
*B32B 27/32* (2006.01)
*H01M 10/052* (2010.01)

(56) References Cited

U.S. PATENT DOCUMENTS

| | | |
|---|---|---|
| 6,660,433 B2 | 12/2003 | Watanabe et al. |
| 6,692,867 B2 | 2/2004 | Nark et al. |
| 7,311,994 B2 | 12/2007 | Sugiyama et al. |
| 2003/0114614 A1* | 6/2003 | Wille et al. .................. 526/247 |
| 2005/0238962 A1 | 10/2005 | Noh |
| 2009/0181295 A1* | 7/2009 | Usami et al. .................. 429/145 |
| 2011/0045338 A1* | 2/2011 | Bae et al. ...................... 429/144 |

FOREIGN PATENT DOCUMENTS

| | | |
|---|---|---|
| JP | 10-223195 A | 8/1998 |
| JP | 2004-111160 A | 4/2004 |
| JP | 2004-241135 A | 8/2004 |
| JP | 2004-303473 A | 10/2004 |
| JP | 2006-331759 A | 12/2006 |
| JP | 2010-176936 A | 8/2010 |
| JP | 4588286 B2 | 11/2010 |
| JP | 2011-228049 A | 11/2011 |
| KR | 10-0399785 B1 | 9/2003 |
| KR | 10-0688402 B1 | 3/2007 |
| KR | 10-0877161 B1 | 1/2009 |

OTHER PUBLICATIONS

Machine English Translation of JP-2004-241135 A, 16 pages.
Machine English Translation of JP-2004-303473 A, 15 pages.
Machine English Translation of JP-2006-331759 A, 20 pages.
Machine English Translation of JP-2010-176936 A, 18 pages.
Japan Publication No. 2003-171495 which corresponds to JP-4588286 B2 and Machine English Translation of JP-2003-171495, 22 pages.
Machine English Translation of JP-2011-228049 A, 24 pages.

* cited by examiner

SEPARATOR FOR RECHARGEABLE LITHIUM BATTERY, AND RECHARGEABLE LITHIUM BATTERY INCLUDING THE SAME

CROSS-REFERENCE TO RELATED APPLICATIONS

This application claims priority to and the benefit of Japanese Patent Application No. 2012-164505 filed in the Japanese Patent Office on Jul. 25, 2012, and Korean Patent Application No. 10-2013-0073190 filed in the Korean Intellectual Property Office on Jun. 25, 2013, the contents of both of which are incorporated herein by reference in their entirety.

BACKGROUND

1. Field

The present disclosure relates to separator for a rechargeable lithium battery and a rechargeable lithium battery including the same.

2. Description of the Related Art

Recently, a rechargeable lithium battery having a higher capacity and a slim size is desired, due to a rapid propagation of tablet computers and smart phones.

Accordingly, an aluminum laminate film is commonly used as an external material for a rechargeable lithium battery since the battery size may be more freely designed.

However, the aluminum laminate film has low rigidity, and thus it can be difficult to improve the rigidity of a rechargeable battery when using the same as an external material.

SUMMARY

According to a first embodiment, a separator for a lithium rechargeable battery is provided. The separator includes a porous substrate; and an adherence porous layer on at least one side of the porous substrate, the adherence porous layer including a first fluorovinylidene-hexafluoropropylene copolymer; a second fluorovinylidene-hexafluoropropylene copolymer, and filler particles; wherein the first fluorovinylidene-hexafluoropropylene copolymer has a weight average molecular weight of greater than or equal to about 1,000,000; the second fluorovinylidene-hexafluoropropylene copolymer includes a structural unit derived from fluorovinylidene and a structural unit derived form hexafluoropropylene, the hexafluoropropylene is included in an amount of greater than or equal to about 10 wt % based on a total amount of the hexafluoropropylene and the fluorovinylidene in the second fluorovinylidene-hexafluoropropylene copolymer, and the filler particles have a particle diameter (D50) of about 1.5 to about 3 μm and a particle diameter (D10) of greater than or equal to about 1 μm.

In one embodiment of the separator, the hexafluoropropylene is included in an amount of from about 10 wt % to 15 wt % based on a total amount of the hexafluoropropylene and the fluorovinylidene in the second fluorovinylidene-hexafluoropropylene copolymer.

In one embodiment of the separator, the first fluorovinylidene-hexafluoropropylene copolymer is different in structure from the second fluorovinylidene-hexafluoropropylene copolymer.

In one embodiment of the separator, the second fluorovinylidene-hexafluoropropylene copolymer has weight average molecular weight which is less than the weight average molecular weight of the first fluorovinylidene-hexafluoropropylene copolymer.

In one embodiment of the separator, the first fluorovinylidene-hexafluoropropylene copolymer has a weight average molecular weight of from about 1,000,000 to about 3,000,000.

In one embodiment of the separator, the second fluorovinylidene-hexafluoropropylene copolymer has a weight average molecular weight of from about 200,000 to about 1,000,000.

In one embodiment of the separator, the second fluorovinylidene-hexafluoropropylene copolymer has a weight average molecular weight of from about 400,000 to about 600,000.

In one embodiment of the separator, the first fluorovinylidene-hexafluoropropylene copolymer is included in an amount of about 20 to 80 wt % based on a total amount of the first fluorovinylidene-hexafluoropropylene copolymer and the second fluorovinylidene-hexafluoropropylene copolymer.

In one embodiment of the separator, the second fluorovinylidene-hexafluoropropylene copolymer is included in an amount of about 20 to 80 wt % based on a total amount of the first fluorovinylidene-hexafluoropropylene copolymer and the second fluorovinylidene-hexafluoropropylene copolymer.

In one embodiment of the separator, the filler particles are included in an amount of about 1 to about 40 wt % based on the total amount of the adherence porous layer.

In one embodiment of the separator, the filler particles comprise a cross-linked polymethyl(meth)acrylate, a cross-linked polystyrene, or a combination thereof.

According to a further embodiment, a rechargeable lithium battery is provided. The rechargeable lithium battery includes a positive electrode; a negative electrode; the separator as described above, between the positive electrode and the negative electrode; and an electrolyte impregnated in the positive electrode, the negative electrode, and the separator.

In one embodiment of the rechargeable lithium battery, the filler particles are included in an amount of about 1 to about 40 wt % based on the total amount of the adherence porous layer.

In one embodiment of the rechargeable lithium battery, the first fluorovinylidene-hexafluoropropylene copolymer has a weight average molecular weight of from about 1,000,000 to about 3,000,000.

In one embodiment of the rechargeable lithium battery, the hexafluoropropylene is included in an amount of from about 10 wt % to about 15 wt % based on total amount of the hexafluoropropylene and the fluorovinylidene in the second fluorovinylidene-hexafluoropropylene copolymer.

In one embodiment of the rechargeable lithium battery, the filler particles comprise a cross-linked polymethyl(meth)acrylate, a cross-linked polystyrene, or a combination thereof.

In one embodiment of the rechargeable lithium battery, the negative electrode comprises a negative active material, a water-soluble polymer, and an elastomer-based polymer.

In one embodiment of the rechargeable lithium battery, the first fluorovinylidene-hexafluoropropylene copolymer is different in structure from the second fluorovinylidene-hexafluoropropylene copolymer.

Other embodiments of the present invention are included in the following detailed description.

According to aspects of embodiment of the present invention, a rechargeable lithium battery including the separator according to embodiments described herein, may have improved buckling resistance and high temperature cycle-life characteristics.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION

In the following detailed description, only certain embodiments of the present invention are shown and described, by way of illustration. As those skilled in the art would recognize, the invention may be embodied in many different forms and should not be construed as being limited to the embodiments set forth herein. Also, in the context of the present application, when a first element is referred to as being "on" a second element, it can be directly on the second element or be indirectly on the second element with one or more intervening elements interposed therebetween. Like reference numerals designate like elements throughout the specification.

Figure 1A:
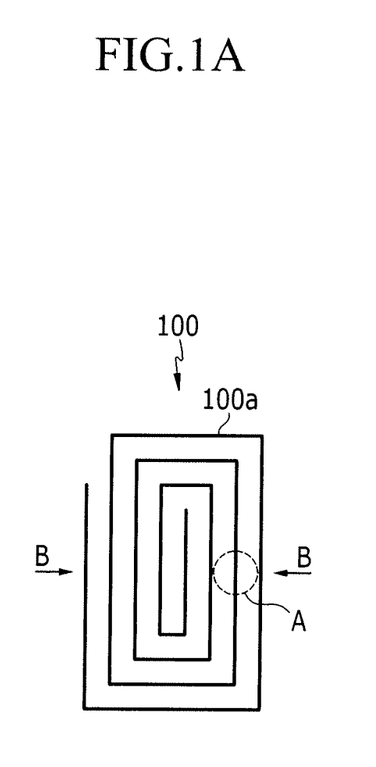
FIG. 1A is a top plan view showing a winding element of a rechargeable lithium battery according to one embodiment.
Figure 1B:
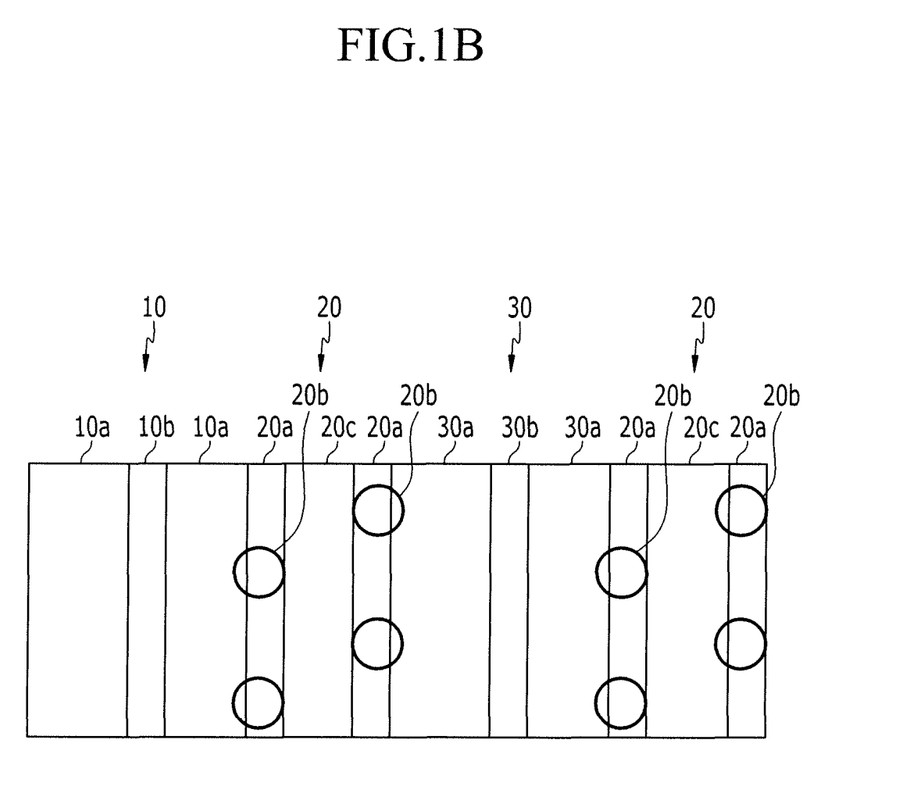
FIG. 1B is an enlarged cross-sectional view of region A in FIG. 1A.

A rechargeable lithium battery including a separator according to one embodiment is described with reference to FIG. 1A and FIG. 1B. FIG. 1A and FIG. 1B show only one example of a structure of rechargeable lithium battery according to one embodiment, and thus the present invention is not limited thereto.

FIG. 1A is a top plan view showing a winding element of a rechargeable lithium battery according to one embodiment; and FIG. 1B is an enlarged cross-sectional view of region A in FIG. 1A.

Referring to FIG. 1A and FIG. 1B, the rechargeable lithium battery according to one embodiment includes a winding element 100, an electrolyte solution, and an external material.

As shown in FIG. 1A, the winding element 100 winds an electrode stack structure 100a, sequentially stacked with a negative electrode 10, a separator 20, a positive electrode 30, and a separator 20, and compresses the electrode stack structure 100a in a length direction, indicated with arrows B in FIG. 1A.

Referring to FIG. 1B, an enlarged cross-sectional view of region A in FIG. 1A, the separator 20 may include a porous substrate 20c and an adherence porous layer 20a formed on at least one side, and specifically, as shown in the embodiment of FIG. 1B, the adherence porous layer 20a is formed on both sides of the porous substrate 20c. However, embodiments of the present invention are not limited thereto.

The porous substrate 20c is not particularly limited and may include any porous substrate having micropores suitable for ion transmission and in which the substrate is suitable for use in a rechargeable lithium battery. For example, the porous substrate may include a polyolefin such as polyethylene, polypropylene, polymethylpentene, and the like; a cellulose-based non-woven fabric; a ceramic paper; or a heat resistant porous sheet such as a polyimide, an aramid and the like.

The adherence porous layer 20a may include a first fluorovinylidene-hexafluoropropylene (VDF-HFP) copolymer, a second fluorovinylidene-hexafluoropropylene (VDF-HFP) copolymer, and filler particles 20b.

A VDF-HFP copolymer may include a structural unit derived from fluorovinylidene and a structural unit derived from hexafluoropropylene.

In one embodiment, the first fluorovinylidene-hexafluoropropylene copolymer is different in structure from the second fluorovinylidene-hexafluoropropylene copolymer.

The first VDF-HFP copolymer may have a weight average molecular weight of about 1,000,000 or greater, from about 1,000,000 to about 3,000,000, or from about 1,500,000 to about 2,500,000. When the first VDF-HFP copolymer has a weight average molecular weight within this range, a viscosity of a coating solution may maintain a suitable ratio of solid, and thus smoothness of the adherence porous layer surface may be improved, and the ease with which a separator may be produced is improved.

The second fluorovinylidene-hexafluoropropylene copolymer may have weight average molecular weight which is less than the weight average molecular weight of the first fluorovinylidene-hexafluoropropylene copolymer, for example, from about 200,000 to about 1,000,000 or from about 400,000 to about 600,000.

The weight average molecular weight of the VDF-HFP copolymers may be measured, for example, using a GPC-900 manufactured by JASCO CORPORATION. The column may be TSKgel Super AWM-H manufactured by TOSOH CORPORATION, and the solvent may be dimethylformamide (DMF).

The second VDF-HFP copolymer may include a structural unit derived from fluorovinylidene and a structural unit derived form hexafluoropropylene, the hexafluoropropylenene is included in an amount of greater than or equal to about 10 wt % or from about 10 wt % to about 15 wt % based on a total amount of the hexafluoropropylene and the fluorovinylidene in the second VDF-HFP copolymer. Within the above range of the hexafluoropropylene, buckling resistance of a rechargeable lithium battery may be improved.

The buckling property refers to a degree to which a rechargeable lithium battery may be folded or bent when applying a compression load in one direction. Accordingly, a buckling resistance refers to a resistance to such folding or bending. For example, buckling resistance increases as a force for folding or bending increases.

A content ratio of hexafluoropropylene may be calculated according to an NMR spectrum. For example, a content ratio of hexafluoropropylene may be obtained by dissolving 20 mg each of the first VDF-HFP copolymer and the second VDF-HFP copolymer into 0.6 ml of dimethyl sulfoxide and measuring $^{19}$F-NMR spectrum of each solution.

A content ratio of the first VDF-HFP copolymer to the second VDF-HFP copolymer is not particularly limited. For example, the first VDF-HFP copolymer may be included in about 20 to 80 wt % based on a total amount of the first fluorovinylidene-hexafluoropropylene copolymer and the second fluorovinylidene-hexafluoropropylene copolymer, and the second VDF-HFP copolymer may be included in about 20 to 80 wt % based on the total amount of the first fluorovinylidene-hexafluoropropylene copolymer and the second fluorovinylidene-hexafluoropropylene copolymer.

The total amount of the first fluorovinylidene-hexafluoropropylene copolymer and the second fluorovinylidene-hexafluoropropylene copolymer is about 60 to 99 wt % based on the adherence porous layer.

The filler particles 20b may have a particle diameter (D50) of about 1.5 to about 3 μm or of about 1.5 to about 2.5 μm. The filler particles 20b may have a particle diameter (D10) of greater than or equal to about 1 μm. An upper limit of the particle diameter (D10) of the filler particles is not particularly limited, but it may be, for example, less than or equal to about 1.5 μm. When the filler particles have the above ranged particle diameter, the adherence porous layer 20a may be coated on the porous substrate 20c as a thin and uniform coating without coagulation.

The particle diameter (D50) refers to a median diameter corresponding to a volume-based accrued value of 50 volume %. The particle diameter (D10) refers to a particle diameter corresponding to a volume-based accrued value of 10 volume %. The particle diameter refers to a particle diameter in which the filler particle is approximated as having a spherical shape and may be measured using, for example, a laser diffraction particle analyzer (e.g., that manufactured by MALVERN, MASTER SIZER).

However, a shape of the filler particles is not particularly limited within the above ranges for particle diameter. In one embodiment, a polymer is used as a filler particle and may be fabricated as a spherical shape by emulsion polymerization or suspension polymerization.

The filler particles may include a cross-linked polymethyl (meth)acrylate, a cross-linked polystyrene or combination thereof. For example, the filler particles may include a cross-linked polymethyl(meth)acrylate.

The cross-linked polymethyl(meth)acrylate may be a polymer including a main material of polymethyl(meth)acrylate, which is chemically cross-linked to form a three dimensionally cross-linked polymer. A cross-linking method for forming a cross-linked polymer is not particularly limited, but examples thereof include polymerizing a multi-functional monomer, a heating method including introducing a cross-linking group-containing monomer, and a cross-linking method of irradiating a polymer with an electron beam, and the like.

The filler particles may be included in an amount of about 1 to about 40 wt % or about 1 to about 30 wt %, based on the total amount of the adherence porous layer. Within the above ranges of the filler particles, the buckling resistance of a rechargeable lithium battery may be improved.

In one embodiment, the adherence porous layer 20a including the first VDF-HFP copolymer, the second VDF-HFP copolymer, and the filler particle, has improved adherence of the adherence porous layer to each electrode in a shear direction, and thus has improved buckling resistance.

The separator may be fabricated using the following method.

The materials for an adherence porous layer, including the first VDF-HFP copolymer, the second VDF-HFP copolymer and the filler particles, are dispersed in a dispersive medium to provide a mixed solution. The mixed solution is then coated on at least one side of the porous substrate to provide a separator. In one embodiment, the porous substrate including an excess amount of the mixed solution is passed between two Meyer bars facing each other through a transporting path and having a predetermined clearance, so as to coat the mixed solution on at least one side of the porous substrate.

In this embodiment, a thickness of film coated on the porous substrate may be controlled by adjusting a diameter of two Meyer bars and their clearance.

A method of coating the mixed solution includes impregnation, spraying or the like, but is not limited thereto. Among them, the impregnation may be used by dipping the porous substrate into a container of a mixed solution and passing the same between the Meyer bars.

The porous substrate, which is passed between the Meyer bars, in some embodiments, is also passed in a coagulation solution. Thereby, an adherence porous layer may be formed on at least one side of the porous substrate.

An amount of remaining solution on the porous substrate may be adjusted by adjusting an amount of mixed solution impregnated into the porous substrate, a thickness of adherence porous layer uniformly formed on the surface of porous substrate, a physical property of the mixed solution, and/or maintaining and supporting properties of the mixed solution onto the porous substrate or the like.

In order to provide a uniform film, the mixed solution may be maintained on the both sides of the porous substrate.

In one embodiment, the negative electrode 10 includes a negative current collector 10b and a negative active material layer 10a formed on at least one side, and in some embodiments, formed on both sides of the negative current collector 10b.

The negative current collector 10b may include any suitable conductive materials, and examples thereof may include aluminum, copper, stainless steel, nickel-plated steel and the like.

A negative terminal may be connected to the negative current collector 10b.

The negative active material layer 10a may include a negative active material.

The negative active material is not particularly limited and may include any material which can be alloyed with lithium or can be reversibly intercalated and deintercalated with lithium. Examples of the negative active material include silicon, metal such as lithium, indium, tin, aluminum, and the like, alloy or oxide thereof; a transition metal oxide such as $Li_{4/3}Ti_{5/3}O_4$, SnO, and the like; a carbon material such as artificial graphite, natural graphite, a mixture of artificial graphite and natural graphite, natural graphite coated with artificial graphite, a graphite carbon fiber, resin-fired carbon, thermal decomposition vapor grown carbon, coke, mesocarbon microbeads (MCMB), a furfuryl alcohol resin-fired carbon, polyacene, a pitch-based carbon fiber, vapor grown carbon fiber, natural graphite, non-graphitzable carbon, and the like. These negative active materials may be used singularly or in a mixture of two or more. Among the carbon materials, the graphite-based material may be used.

The negative active material layer 10a may further include a thickener and a binder.

The thickener may be used to adjust a viscosity of negative active material layer slurry to be suitably coated on the negative current collector 10b and also may act as a binder in the negative active material layer 10a.

The thickener may include a water-soluble polymer. Examples of the water-soluble polymer include a cellulose-based polymer such as carboxylmethylcellulose, methylcellulose, ethylcellulose, hydroxypropylcellulose and the like, an ammonium salt thereof or an alkali metal salt thereof; a polyacrylic acid salt such as polyacrylic acid sodium salt and the like; polyvinylalcohol or a derivative thereof; polyethyleneoxide; polyvinylpyrrolidone; starch; phosphoric acid starch; casein; a modified starch; chitin; and a chitosan derivative, and the like. These thickeners may be used singularly or in a mixture of two or more. Among the thickeners, the cellulose-based polymer may be used, or for example, an alkali metal salt of carboxymethyl cellulose may be used.

The binder may maintain a shape of the negative active material layer 10a and may provide the negative active material layer 10a with flexibility.

When the binder is added into a slurry including an organic solvent for as a dispersive medium, a polymer capable of being dissolved in the organic solvent may be used. Examples of the polymer include a fluorovinylidene polymer, a fluorovinylidene-hexafluoropropylene copolymer, an acrylonitrile polymer, a derivative of these polymers (modified by an acid group), and the like.

When the binder is added into a slurry including water for as a dispersive medium, a water dispersion of the binder may be used. The binder may include an elastomer-based polymer. Examples of the elastomer-based polymer include a styrene-butadiene rubber (SBR), a butadiene rubber (BR), a nitrile butadiene rubber (NBR), a natural rubber (NR), an isoprene rubber (IR), an ethylene-propylene-diene terpolymer (EPDM), a chloroprene rubber (CR), a chlorosulfonated polyethylene (CSM), a copolymer of an acrylic acid ester or methacrylic acid ester or a partially or wholly hydrolyzed derivative thereof, an acrylic acid ester-based copolymer, and the like. In order to improve adherence, the binder may be modified with a monomer having a polar functional group such as a carboxylic acid group, a sulfonic acid group, a phosphoric acid group, a hydroxy group, and the like.

A composition ratio of the negative active material, the thickener, and the binder is not particularly limited. For example, the negative active material layer 10a may include about 90 to about 99 wt % of the negative active material, about 0.5 to about 5 wt % of the thickener, and about 0.5 to about 5 wt % of the binder.

The thickness of the negative electrode 10 is not particularly limited.

In one embodiment, the positive electrode 30 includes a positive electrode current collector 30b and a positive active material layer 30a formed on at least one side, and in some embodiments, formed on both sides of the positive electrode current collector 30b.

The positive electrode current collector 30b may include any suitable conductor, for example, aluminum, stainless steel, nickel plated steel or the like.

The positive electrode current collector 30b may be connected to a positive terminal.

The positive active material layer 30a may include a positive active material.

The positive active material is not particularly limited and may include any material which can reversibly intercalate and deintercalate lithium ions. For example, the positive active material may include lithium cobalt oxide, lithium nickel oxide, lithium nickel cobalt oxide, lithium nickel cobalt aluminum oxide, lithium nickel cobalt manganese oxide, lithium manganese oxide, lithium iron phosphate, nickel sulfide, copper sulfide, sulfur, iron oxide, vanadium oxide, or the like. These positive active materials can be used singularly or in a mixture of two or more. For example, a lithium transition metal oxide having layered rock salt structure may be used.

Herein a layer refers to a thin sheet. The rock salt structure refers to a sodium chloride structure, which is a kind of a crystal structure, and refers to a structure made up of face centered cubes of cations and face centered cubes of anions, offset by ½ of a unit cell length in one direction.

The lithium transition metal oxide having the layered rock salt structure may include, for example, a compound represented by the following Chemical Formula 1 or a compound represented by the following Chemical Formula 2:

Chemical Formula 1

Chemical Formula 2

In the above Chemical Formulae 1 and 2, $0<x<1$, $0<y<1$, $0<z<1$ and $x+y+z<1$.

The positive active material layer 30a may further include a binder.

The binder may bind the positive active material and may bind the positive active material to the positive electrode current collector.

The binder is not particularly limited, and examples include a fluorinated resin such as polyfluorovinylidene (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), polyfluorovinyl (PVF), and the like, an acrylonitrile copolymer, an acrylic acid ester copolymer, a methacrylic acid ester copolymer, and the like.

Further examples of the binder include a fluorinated resin such as polyfluorovinylidene (PVdF), polytetrafluoroethylene (PTFE), a tetrafluoroethylene-hexafluoropropylene copolymer (FEP), a tetrafluoroethylene-perfluoroalkylvinylether copolymer (PFA), an ethylene-tetrafluoroethylene copolymer (ETFE), polychlorotrifluoroethylene (PCTFE), an ethylene-chlorotrifluoroethylene copolymer (ECTFE), polyfluorovinyl (PVF), and the like, an acrylonitrile copolymer, an acrylic acid ester copolymer, and a methacrylic acid ester copolymer, and the like. The binder may include the above-described elastomer-based polymer.

The positive electrode and the negative electrode may further include a conductive additive or other additives.

By way of example, the negative electrode 10 and the positive electrode 30 may be fabricated by the following method:

Each material for the negative electrode and the positive electrode is dispersed in a dispersive medium to provide a negative active material layer slurry and a positive active material layer slurry, respectively and then is coated on at least one side of a respective current collector and dried by heating to remove a medium and provide a negative electrode and a positive electrode, respectively.

The electrode stack structure 100a may be obtained by sequentially stacking the negative electrode 10, the separator 20, the positive electrode 30, and the separator 20. Thereby, the separator 20 is disposed on one side of the electrode stack structure 100a, and the negative electrode 10 is disposed on the other side of the electrode stack structure 100a, so that the negative electrode 10 makes contact with the separator 20 by winding the electrode stack structure. Accordingly, the winding element 100 may be conducted in a direction parallel to the arrow indicated in B.

The electrolyte solution is a solution including a lithium salt dissolved in an organic solvent. The lithium salt may include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, LiBOB, and the like. These lithium salts may be used singularly or in a mixture of two or more. The organic solvent may include a cyclic carbonate ester such as propylene carbonate, ethylene carbonate or the like or a linear carbonate ester such as diethyl carbonate, dimethyl carbonate, ethylmethyl carbonate or the like. These organic solvents may be used singularly or in a mixture of two or more. The electrolyte solution may be impregnated in the positive electrode, the negative electrode, and the separator.

The external material may include, for example, aluminum laminate or the like.

Hereinafter, embodiments are illustrated in more detail with reference to the following examples. However, these are only certain examples, and the present disclosure is not limited thereto.

Furthermore, any features which are not explicitly recited herein, are those which would be understood by those of ordinary skill in the art.

Example 1

Manufacture of Positive Electrode 95 wt % of $LiCoO_2$, 2 wt % of a conductive agent of carbon black, and 3 wt % of a binder of polyfluorovinylidene were mixed and dispersed in a dispersive medium of N-methyl-2-pyrrolidone to provide a positive active material layer slurry. Subsequently, the positive active material layer slurry was uniformly coated on both sides of positive electrode current collector of aluminum foil having a thickness of 15 μm and dried and then compressed by a roll press to provide a positive electrode. Then, a positive terminal was mounted at the positive electrode current collector. The positive active material layers formed on both sides of the positive electrode current collector had a thickness of 110 μm.

Manufacture of Negative Electrode 98 wt % of graphite powder, 1 wt % of sodium salt of carboxylmethylcellulose and 1 wt % of water dispersion of carboxyl modified styrene-butadiene copolymer were dispersed in a dispersive medium of deionized water to provide a negative active material layer slurry. Subsequently, the negative active material layer slurry was uniformly coated on both surfaces of a negative current collector of copper foil having a thickness of 9 μm and dried and compressed by a roll press to provide a negative electrode. Then the negative current collector was mounted with a negative terminal. The negative active material layers formed on both sides of the negative current collector had a thickness of 120 μm.

Manufacture of Separator 1.5 wt % of a first fluorovinylidene-hexafluoropropylene (VDF-HFP) copolymer (97 wt % of fluorovinylidene and 3 wt % of hexafluoropropylene) having a weight average molecular weight of 1,950,000, 3.5 wt % of a second fluorovinylidene-hexafluoropropylene (VDF-HFP) copolymer (89 wt % of fluorovinylidene and 11 wt % of hexafluoropropylene) having a weight average molecular weight of 470,000, 5 parts by weight of a filler particle having a particle diameter (D10) of 1.3 μm and a particle diameter (D50) of 1.8 μm and including cross-linked polymethyl(meth)acrylate, 66.5 wt % of dimethyl acetamid, and 28.5 wt % of tripropyleneglycol were mixed to provide a mixed solution.

Subsequently, a coagulation solution including 50 wt % of water, 30 wt % of dimethyl acetamide, and 20 wt % of tripropyleneglycol was prepared.

Subsequently, the mixed solution was coated on both sides of polyethylene micro porous layer having a thickness of 9 μm. The coating was performed using a manufacturing apparatus shown in FIG. 1 of Japanese Patent No. 4588286. In this example, for a weighting and smoothing jig, a Meyer bar having a diameter of 20 mm was used. The air gap between 2 Meyer bars and the coagulation solution was 7 cm. The clearance between 2 Meyer bars was 40 μm, and the polyethylene micro porous layer was disposed in the center of two Meyer bars. Then the mixed solution controlled at 30° C. and the coagulation solution controlled at 40° C. were introduced into a predetermined container.

The polyethylene microporous layer was moved in a speed of 3 m/minute, coated and coagulated, and then washed and dried to provide a separator. In this example, the coagulation time was 30 seconds, the adherence porous layer formed on the both sides of the polyethylene microporous layer had a thickness of 3 μm and a weight of 2 g/m².

Manufacture of Rechargeable Lithium Battery Cell

The obtained positive electrode, negative electrode and separator were stacked in the order shown in FIG. 1 and wound in a length direction and compressed to provide a flat winding element.

The winding element was inserted into an external material including a laminate film of three layers of polypropylene/aluminum/nylon from the inside and having a thickness of 120 μm, and the electrode terminal was taken out of the external material by the heat fusion.

An electrolyte solution in which $LiPF_6$ was dissolved in a mixed solvent of ethylene carbonate (EC) and diethyl carbonate (DEC) (weight ratio of EC:DEC=3:7) at a concentration of 1.2 mol/L was injected in the external member inserted with the winding element, and the other side of the external material was sealed by the heat fusion under the reduced pressure, and was then heated on a metal plate at 80° C. for 3 minutes to provide a rechargeable lithium battery having a thickness 3 mm×width 30 mm×height 30 mm.

Examples 2 to 6 and Comparative Examples 1 to 4

Each rechargeable lithium battery was fabricated in accordance with the same procedure as in Example 1, except that the composition of the first VDF-HFP copolymer, the second VDF-HFP copolymer, and the filler particle was changed as shown in the following Table 1 to provide a separator.

Evaluation 1: Measurement of Initial Discharge Capacity

Each rechargeable lithium battery obtained from Examples 1 to 6 and Comparative Examples 1 to 4 was charged in a constant current of 30 mA until 4.2V at 25° C. and continuously charged in a constant voltage until the charge current of 3 mA. Then, it was discharged in the constant current at 60 mA until the end voltage of 3.0V. The discharged capacity corresponds to the initial discharge capacity.

Evaluation 2: Buckling Test

The initial discharge capacity was measured in Evaluation 1, and then the buckling strength was measured using a desktop precise universal testing machine of AGS-X manufactured by Shimadzu Corporation.

Specifically, the rechargeable lithium battery was loaded in a jig having a gap 15 mm, and an indenter having a gap diameter curvature of 2 mmϕ and width of 30 mm was disposed in parallel to the winding element. And the load was measured when pushing an indenter from below at 1 mm/minute, and the maximum load was considered as a buckling point of a rechargeable lithium battery to determine the buckling strength.

Figure 2:
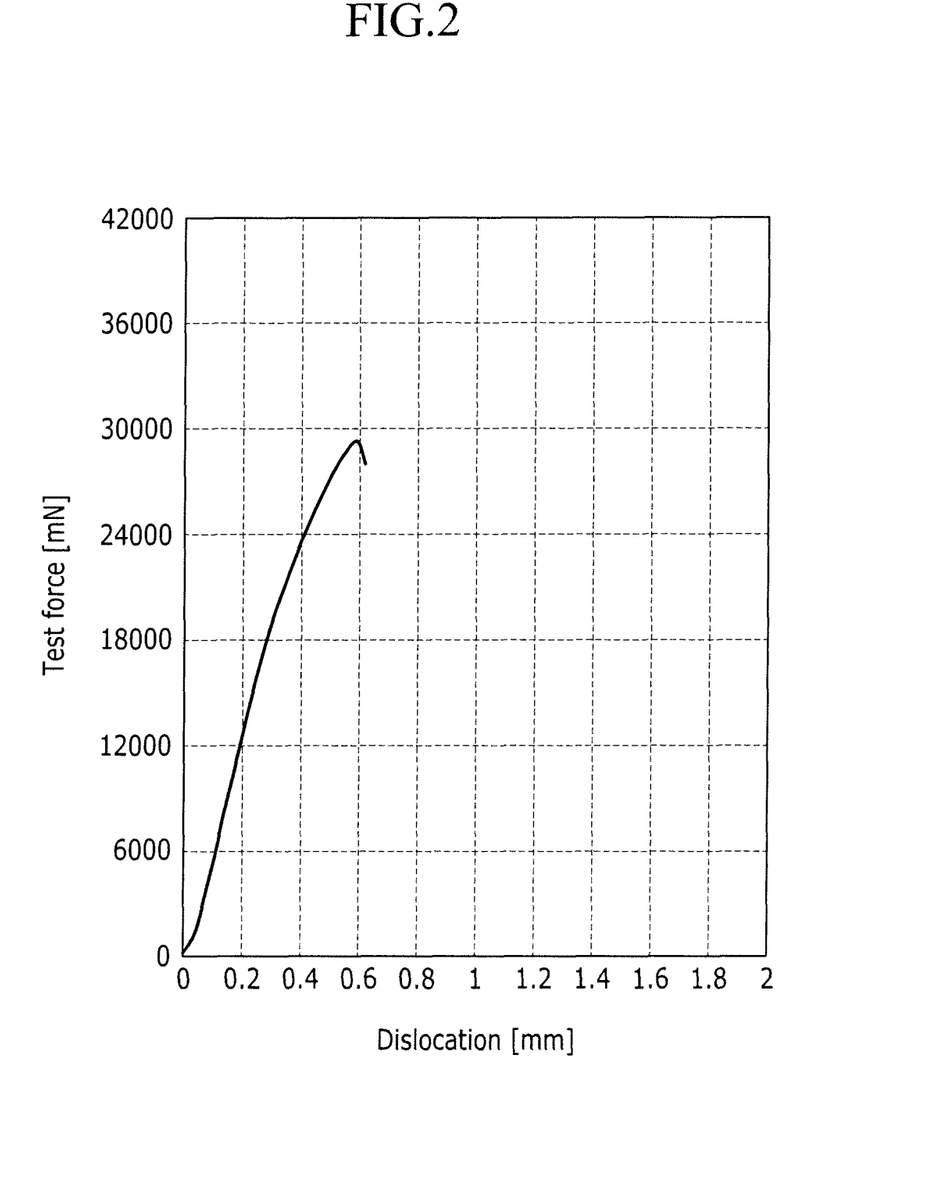
FIG. 2 is a graph showing a correlation between an indenter displacement and a test force by applying the indenter in a buckling test of a rechargeable lithium battery.

FIG. 2 is a graph showing the correlation between the indenter dislocation and the test force loaded in the indenter in the buckling test of a rechargeable lithium battery. In FIG. 2, since the rechargeable lithium battery was buckled at a load of 29000 mN, the rechargeable lithium battery had a buckling strength of 29000 mN.

Evaluation 3: High Temperature Cycle-Life Characteristic

Each rechargeable lithium battery according to Examples 1 to 6 and Comparative Examples 1 to 4 was measured for the initial discharge capacity of Evaluation 1, and then was charged at 300 mA until 4.2V in a thermostat at 50° C., and continuously charged in the constant voltage until the current of 30 mA. Subsequently, it was discharged in the constant current of 300 mA until 3.0V. The charge and discharge operation was repeated for 300 times, and the discharge capacity was measured, and the capacity retention was calculated and is shown in the following Table 1.

In Table 1, the capacity retention (%) is provided as a percentage of 300th discharge capacity to the initial discharge capacity at 50° C.

TABLE 1

| | | Examples | | | | |
|---|---|---|---|---|---|---|
| | | 1 | 2 | 3 | 4 | 5 |
| PVdF | Weight average molecular weight | — | — | — | — | — |
| | Amount (wt %)* | — | — | — | — | — |
| First VDF-HFP copolymer | Weight average molecular weight | 1950000 | 1950000 | 1950000 | 1950000 | 1950000 |
| | HFP content (wt %)** | 3 | 3 | 3 | 3 | 3 |
| | Amount (wt %)* | 1.5 | 3.5 | 1.5 | 3.5 | 3.5 |
| Second VDF-HFP copolymer | Weight average molecular weight | 470000 | 470000 | 470000 | 470000 | 470000 |
| | HFP content (wt %)** | 11 | 11 | 11 | 11 | 11 |
| | Amount (wt %)* | 3.5 | 1.5 | 3.5 | 1.5 | 1.5 |
| Filler Particle (parts by weight)*** | | 0.25 | 0.25 | 0.25 | 0.5 | 0.75 |
| Dimethyl acetamide (wt %)* | | 66.5 | 66.5 | 66.5 | 66.5 | 66.5 |
| Tripropylene glycol (wt %)* | | 28.5 | 28.5 | 28.5 | 28.5 | 28.5 |
| Buckling strength (mN) | | 52000 | 48000 | 54000 | 53000 | 53000 |
| Capacity retention (%) | | 88 | 91 | 86 | 92 | 92 |

| | | Examples | Comparative Examples | | | |
|---|---|---|---|---|---|---|
| | | 6 | 1 | 2 | 3 | 4 |
| PVdF | Weight average molecular weight | — | 470000 | — | — | — |
| | Amount (wt %)* | — | 5 | — | — | — |
| First VDF-HFP copolymer | Weight average molecular weight | 1950000 | — | 1950000 | — | 1950000 |
| | HFP content (wt %)** | 3 | — | 3 | — | 3 |
| | Amount (wt %)* | 3.5 | — | 5 | — | 1.5 |
| Second VDF-HFP copolymer | Weight average molecular weight | 470000 | — | — | 860000 | 470000 |
| | HFP content (wt %)** | 11 | — | — | 11 | 11 |
| | Amount (wt %)* | 1.5 | — | — | 5 | 3.5 |
| Filler Particle (parts by weight)*** | | 1.5 | — | — | — | — |
| Dimethyl acetamide (wt %)* | | 66.5 | 66.5 | 66.5 | 66.5 | 66.5 |

TABLE 1-continued

| | | | | | |
|---|---|---|---|---|---|
| Tripropylene glycol (wt %)* | 28.5 | 28.5 | 28.5 | 28.5 | 28.5 |
| Buckling strength (mN) | 53000 | 30000 | 39000 | 41000 | 44000 |
| Capacity retention (%) | 93 | 85 | 82 | 77 | 80 |

(wt %)* is a unit based on the total 100 of PVdF, a first VDF-HFP copolymer, a second VDF-HFP copolymer, dimethyl acetamide, and tripropyleneglycol.
(wt %)** is a unit showing each HFP content based on the total amount of the first VDF-HFP copolymer or the total amount of the second VDF-HFP copolymer.
(part by weight)*** is a unit based on total 100 parts by weight of PVdF, the first VDF-HFP copolymer, the second VDF-HFP copolymer, dimethyl acetamide, and tripropyleneglycol.
Weight average molecular weight of the first VDF-HFP copolymer and the second VDF-HFP copolymer was measured by GPC-900 manufactured by JASCO CORPORATION under the following conditions:
Column: TSKgel Super AWM-H (two) (manufactured by thor)
Mobile solvent: dimethylformamide (DMF)
Standard sample: mono dispersion polystyrene (manufactured by thor)
Column temperature: 40° C.
Flow rate: 10 ml/minute.

The content ratio of hexafluoropropylene (HFP) was obtained by dissolving 20 mg of the first VDF-HFP copolymer and 20 mg the second VDF-HFP copolymer in 0.6 ml of dimethyl sulfoxide at 100° C. and measuring $^{19}$F-NMR spectrum of the respective solutions.

The filler particle was dispersed in water containing a non-ionic surfactant (Triton X-100), and the particle diameter of filler particle was measured by using a laser diffraction particle analyzer (MASTER SIDER-2000 manufactured by Sysmex). For the volume-based particle diameter distribution, the particle diameter (D10) was determined by the particle diameter of reaching the accrued volume from the small size to 10%, and particle diameter (D50) was determined by was determined by the particle diameter of reaching the accrued volume from the small size to 50%.

As shown in Table 1, it is understood that Examples 1 to 6 according to one embodiment had the improved buckling resistance while maintaining the excellent high temperature cycle-life characteristics compared to Comparative Examples 1 to 4.

While this invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

DESCRIPTION OF SOME OF THE SYMBOLS

100: winding element
100a: electrode stack structure
10: negative electrode
20: separator
20a: adherence porous layer
20b: filler particles
20c: porous substrate
30: positive electrode

What is claimed is:

1. A separator for a rechargeable lithium battery comprising:
   a porous substrate; and
   an adherence porous layer on at least one side of the porous substrate, the adherence porous layer comprising a first fluorovinylidene-hexafluoropropylene copolymer; a second fluorovinylidene-hexafluoropropylene copolymer different in structure from the first fluorovinylidene-hexafluoropropylene copolymer, and filler particles; wherein:
   the first fluorovinylidene-hexafluoropropylene copolymer has a weight average molecular weight of greater than or equal to about 1,000,000;
   the second fluorovinylidene-hexafluoropropylene copolymer includes a structural unit derived from fluorovinylidene and a structural unit derived from hexafluoropropylene, the hexafluoropropylene is included in an amount of greater than or equal to about 10 wt % based on a total amount of the hexafluoropropylene and the fluorovinylidene in the second fluorovinylidene-hexafluoropropylene copolymer, and
   the filler particles have a particle diameter (D50) of about 1.5 to about 3 μm and a particle diameter (D10) of greater than or equal to about 1 μm.

2. The separator of claim 1, wherein the hexafluoropropylene is included in an amount of from about 10 wt % to 15 wt % based on a total amount of the hexafluoropropylene and the fluorovinylidene in the second fluorovinylidene-hexafluoropropylene copolymer.

3. The separator of claim 1, wherein the second fluorovinylidene-hexafluoropropylene copolymer has weight average molecular weight which is less than the weight average molecular weight of the first fluorovinylidene-hexafluoropropylene copolymer.

4. The separator of claim 1, wherein the first fluorovinylidene-hexafluoropropylene copolymer has a weight average molecular weight of from about 1,000,000 to about 3,000,000.

5. The separator of claim 1, wherein the second fluorovinylidene-hexafluoropropylene copolymer has a weight average molecular weight of from about 200,000 to about 1,000,000.

6. The separator of claim 1, wherein the second fluorovinylidene-hexafluoropropylene copolymer has a weight average molecular weight of from about 400,000 to about 600,000.

7. The separator of claim 1, wherein the first fluorovinylidene-hexafluoropropylene copolymer is included in an amount of about 20 to 80 wt % based on a total amount of the first fluorovinylidene-hexafluoropropylene copolymer and the second fluorovinylidene-hexafluoropropylene copolymer.

8. The separator of claim 1, wherein the second fluorovinylidene-hexafluoropropylene copolymer is included in an amount of about 20 to 80 wt % based on a total amount of the first fluorovinylidene-hexafluoropropylene copolymer and the second fluorovinylidene-hexafluoropropylene copolymer.

9. The separator of claim 1, wherein the filler particles are included in an amount of about 1 to about 40 wt % based on the total amount of the adherence porous layer.

10. The separator of claim 1, wherein the filler particles comprise a cross-linked polymethyl(meth)acrylate, a cross-linked polystyrene, or a combination thereof.

11. A rechargeable lithium battery, comprising
a positive electrode;
a negative electrode;
the separator according to claim 1 between the positive electrode and the negative electrode; and
an electrolyte impregnated in the positive electrode, the negative electrode, and the separator.

12. The rechargeable lithium battery of claim 11, wherein the filler particles are included in an amount of about 1 to about 40 wt % based on the total amount of the adherence porous layer.

13. The rechargeable lithium battery of claim 11, wherein the first fluorovinylidene-hexafluoropropylene copolymer has a weight average molecular weight of from about 1,000,000 to about 3,000,000.

14. The rechargeable lithium battery of claim 11, wherein the hexafluoropropylene is included in an amount of from about 10 wt % to about 15 wt % based on total amount of the hexafluoropropylene and the fluorovinylidene in the second fluorovinylidene-hexafluoropropylene copolymer.

15. The rechargeable lithium battery of claim 11, wherein the filler particles comprise a cross-linked polymethyl(meth)acrylate, a cross-linked polystyrene, or a combination thereof.

16. The rechargeable lithium battery of claim 11, wherein the negative electrode comprises a negative active material, a water-soluble polymer, and an elastomer-based polymer.

17. The rechargeable lithium battery of claim 11, wherein the first fluorovinylidene-hexafluoropropylene copolymer is different in structure from the second fluorovinylidene-hexafluoropropylene copolymer.

* * * * *